United States Patent
Kuo

(10) Patent No.: US 10,870,716 B2
(45) Date of Patent: Dec. 22, 2020

(54) CATALYST SYSTEMS AND METHODS FOR PREPARING AND USING THE SAME

(71) Applicant: ExxonMobil Chemical Patents Inc., Baytown, TX (US)

(72) Inventor: Chi-I Kuo, Atascocita, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/907,767

(22) Filed: Feb. 28, 2018

(65) Prior Publication Data

US 2018/0273655 A1 Sep. 27, 2018

Related U.S. Application Data

(60) Provisional application No. 62/475,282, filed on Mar. 23, 2017.

(51) Int. Cl.
| | | |
|---|---|---|
| *C08F 4/6592* | (2006.01) | |
| *C08F 10/14* | (2006.01) | |
| *C08F 10/02* | (2006.01) | |
| *C08F 10/08* | (2006.01) | |
| *C08F 10/06* | (2006.01) | |
| *C08F 10/00* | (2006.01) | |
| *C08F 4/659* | (2006.01) | |

(52) U.S. Cl.
CPC ............. *C08F 10/14* (2013.01); *C08F 10/00* (2013.01); *C08F 10/02* (2013.01); *C08F 10/06* (2013.01); *C08F 10/08* (2013.01); *C08F 4/65912* (2013.01); *C08F 4/65925* (2013.01); *C08F 4/65927* (2013.01); *C08F 2410/01* (2013.01); *C08F 2420/02* (2013.01)

(58) Field of Classification Search
CPC ........................... C08F 4/65916; C08F 4/6592
See application file for complete search history.

(56) References Cited

U.S. PATENT DOCUMENTS

| | | | |
|---|---|---|---|
| 5,942,459 A | 8/1999 | Sugano et al. | |
| 6,743,873 B2 * | 6/2004 | Kirk | C08F 4/65916 526/204 |
| 7,153,915 B2 * | 12/2006 | Clikeman | C08F 10/00 526/159 |
| 2006/0222849 A1 | 10/2006 | Matsumura et al. | |
| 2016/0319050 A1 * | 11/2016 | Hong | C08F 4/65927 |

FOREIGN PATENT DOCUMENTS

| | | |
|---|---|---|
| EP | 0743324 A | 11/1996 |
| WO | 2005/095468 A | 10/2005 |

* cited by examiner

*Primary Examiner* — Caixia Lu
(74) *Attorney, Agent, or Firm* — ExxonMobil Chemical Patents Inc.—Law Department

(57) ABSTRACT

Methods for preparing a catalyst system that includes contacting at least one aromatic hydrocarbon, at least one activator, at least one catalyst having a Group 3 through Group 12 metal atom or lanthanide metal atom, and at least one catalyst support to form a first mixture, are provided. Methods include reducing the amount of the aromatic hydrocarbon in the first mixture to form a second mixture having 1.5 wt % or less of the aromatic hydrocarbon based on the total weight of the second mixture. Methods may further include adding a saturated hydrocarbon to the second mixture to form a third mixture.

9 Claims, No Drawings

CATALYST SYSTEMS AND METHODS FOR PREPARING AND USING THE SAME

CROSS REFERENCE TO RELATED APPLICATION

This application claims the benefit of Ser. No. 62/475,282, filed Mar. 23, 2017, the disclosure of which is hereby incorporated by reference in its entirety.

FIELD OF THE INVENTION

The present disclosure relates to catalyst systems for olefin polymerization, methods of preparing the catalyst systems, and methods for polymerizing olefins to produce polyolefin compositions.

BACKGROUND OF THE INVENTION

Polyolefin polymers are widely used commercially because of their robust physical properties. For example, various types of polyethylene polymers, including high density, low density, and linear low density polyethylene polymers, are some of the most commercially useful. Polyolefin polymers are typically prepared with a catalyst(s) (mixed with one or more other components to form a catalyst system) which facilitates polymerization of olefin monomers in a reactor, such as a gas phase, fluidized bed reactor, to produce polyolefin polymers.

Improvements in process operability (e.g., sheeting, fouling, etc.) for polyolefin formation have included modifying the catalyst system by preparing the catalyst system in different ways. For example, process operability improvements have included: combining the catalyst system components in a particular order; manipulating the ratio of the various catalyst system components; varying the contact time and/or temperature when combining the components of a catalyst system; or simply adding various compounds, such as carboxylic acids or other additives, to the catalyst system. However, such improvements on process operability have resulted in catalyst systems that are increasingly difficult to feed to a reactor. For example, the catalyst systems become sticky or build up static, thus, preventing continuous and smooth flow of the catalyst systems into the reactor.

The ability of a catalyst system to flow into a reactor is known as flowability and can be improved by preparing the catalyst system in the presence of a solvent such as toluene because toluene typically readily dissolves one or more of the components used in commercial catalyst systems. For example, it is commonly believed that toluene can interact with the cyclopentadiene ring of a metallocene catalyst to promote dissolution by interactions of the π orbitals of the rings (i.e., π stacking). As a result, toluene was believed to be necessary in the preparation of metallocene catalyst systems. As such, it is commonly used in the preparation of the metallocene catalyst systems and also in the delivery of the catalyst system to the polymerization reactor. However, articles such as films made from polyolefin polymers are often used as plastic packaging for food products and the amount of non-polyolefin material present in the articles is increasingly becoming more regulated in various jurisdictions around the world.

Therefore, there is a need for catalyst systems that possess good flowability to be delivered to the polymerization reactor but also reduce or eliminate the amount of toluene used in the preparation of the catalyst system.

SUMMARY OF THE INVENTION

In a class of embodiments, the invention provides for a method for preparing a catalyst system that comprises contacting at least one aromatic hydrocarbon, such as toluene, at least one activator, at least one catalyst having a Group 3 through Group 12 metal atom or lanthanide metal atom, and at least one catalyst support to form a first mixture. The method includes reducing the amount of toluene in the first mixture to form a second mixture having 1.5 wt % or less of the aromatic hydrocarbon based on the total weight of the second mixture. The method may further include adding a saturated hydrocarbon to the second mixture to form a third mixture.

In another class of embodiments, the invention provides for a catalyst system comprising a catalyst having a Group 3 through Group 12 metal atom or lanthanide metal atom. The catalyst system further includes at least one activator, at least one support material, 1.5 wt % or less of the aromatic hydrocarbon based on the total weight of the catalyst system, and a saturated hydrocarbon.

In yet another class of embodiments, the invention provides for a method of polymerizing olefins to produce a polyolefin composition, the method comprising contacting at least one olefin with the catalyst system as described above.

Other embodiments of the invention are described and claimed herein and are apparent by the following disclosure.

DETAILED DESCRIPTION OF THE INVENTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

The present disclosure relates to catalyst systems for olefin polymerization, methods of producing the catalyst systems, and polyolefins formed from the catalyst systems. Embodiments of the present disclosure include methods for preparing a catalyst system including contacting at least one aromatic hydrocarbon, such as toluene, at least one activator, at least one catalyst having a Group 3 through Group 12 metal atom or lanthanide metal atom, and at least one catalyst support to form a first mixture, reducing the amount of aromatic hydrocarbon to form a second mixture having 1.5 wt % or less of aromatic hydrocarbon based on the total weight of the second mixture; and adding a saturated hydrocarbon to the second mixture to form a third mixture which is a catalyst system of the present disclosure. The catalyst having a Group 3 through Group 12 metal atom or lanthanide metal atom can be a metallocene catalyst comprising a Group 4 metal. Aromatic hydrocarbons includes toluene, benzene, ortho-xylene, meta-xylene, para-xylenes, naphthalene, anthracene, phenanthrene, and mixtures thereof.

In at least one embodiment, reducing the amount of the aromatic hydrocarbon comprises applying heat at about 70° C. or less, such as about 60° C., 50° C., or 40° C. or less, to the first and/or second mixture. After reducing the amount of the aromatic hydrocarbon, the second mixture can have 0.5 wt % or less of the aromatic hydrocarbon based on the total weight of the second mixture, such as about 0 wt % based on the total weight of the second mixture.

Embodiments of the present disclosure also include catalyst systems including a Group 4 metal catalyst selected from a metallocene catalyst or a bis(phenolate) catalyst. Catalyst systems can further include at least one activator, at least one support material, at least one saturated hydrocarbon, and 1.5 wt % or less of the aromatic hydrocarbon based on the total weight of the catalyst system. The activator of the catalyst system can be an alkylalumoxane, such as methylalumoxane.

The addition of a saturated hydrocarbon provides a catalyst system with reduced aromatic hydrocarbon content while allowing the catalyst system to provide adequate flowability for transportation and/or introduction into a reactor. Providing adequate flowability would not be expected since catalyst system components such as an activator, for example methylalumoxane, precipitate in the presence of saturated hydrocarbon. Without being bound by theory, it is believed that saturated hydrocarbons typically do not dissolve substantially in inorganic materials such as alumoxanes due to the difference in polarity of the materials, saturated hydrocarbon being non-polar while alumoxanes are typically polar. Furthermore, drying a catalyst system to such low wt % of an aromatic hydrocarbon would be expected to change the surface properties (e.g., formation of cracks/crevices) of the catalyst system, reducing the productivity of the catalyst system for the polymerization process. It has been discovered that neither drying nor the addition of saturated hydrocarbon to catalyst systems of the present disclosure reduces the productivity of the catalyst system for polymerization.

Reduced aromatic hydrocarbon content in the catalyst system provides polyolefin products having reduced aromatic hydrocarbon content. The polyolefin products may be used as plastic packaging for food products. Furthermore, many saturated hydrocarbons have lower boiling points than aromatic hydrocarbons, such as toluene (110° C.), which makes the saturated hydrocarbons easier to remove from the polyolefin products.

As used herein, the term "saturated hydrocarbon" includes hydrocarbons that contain zero carbon-carbon double bonds. The saturated hydrocarbon can be a linear or cyclic hydrocarbon. The saturated hydrocarbon can be a $C_4$-$C_{40}$ hydrocarbon and mixtures thereof, such as a $C_4$-$C_7$ hydrocarbon and mixtures thereof. In at least one embodiment, the $C_4$-$C_{40}$ hydrocarbon is cyclohexane, isopentane, isohexane, hexane, heptane, or mixtures thereof. Catalyst systems of the present disclosure can have 1.5 wt % or less, 0.5 wt % or less, or about 0 wt % of the aromatic hydrocarbon based on the total weight of the catalyst system.

In at least one embodiment, a method of polymerizing olefins to produce a polyolefin composition includes contacting at least one olefin with a catalyst system and obtaining a polyolefin having 0.01 mg/m² or less of the aromatic hydrocarbon. Polymerization can be conducted at a temperature of from about 0° C. to about 300° C., at a pressure in the range of from about 0.35 MPa to about 10 MPa, and at a time up to about 300 minutes. The at least one olefin can be ethylene, propylene, butene, pentene, hexene, heptene, octene, nonene, decene, undecene, dodecene, or mixtures thereof.

For purposes of the present disclosure, the numbering scheme for the Periodic Table Groups is used as described in CHEMICAL AND ENGINEERING NEWS, 63(5), pg. 27 (1985). Therefore, a "Group 4 metal" is an element from group 4 of the Periodic Table, e.g., Hf, Ti, or Zr.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat⁻¹hr⁻¹. Conversion is the amount of monomer that is converted to polymer product, and is reported as mol % and is calculated based on the polymer yield (weight) and the amount of monomer fed into the reactor. Catalyst activity is a measure of the level of activity of the catalyst and is reported as the mass of product polymer (P) produced per mass of supported catalyst (cat) (gP/g supported cat). In an at least one embodiment, the activity of the catalyst is at least 800 gpolymer/gsupported catalyst/hour, such as about 1,000 or more gpolymer/gsupported catalyst/hour, such as about 2,000 or more gpolymer/gsupported catalyst/hour, such as about 3,000 or more gpolymer/gsupported catalyst/hour, such as about 4,000 or more gpolymer/gsupported catalyst/hour, such as about 5,000 or more gpolymer/gsupported catalyst/hour.

An "olefin," alternatively referred to as "alkene," is a linear, branched, or cyclic compound of carbon and hydrogen having at least one double bond. When a polymer or copolymer is referred to as comprising an olefin, the olefin present in such polymer or copolymer is the polymerized form of the olefin. For example, when a copolymer is said to have an ethylene content of 35 wt % to 55 wt %, it is understood that the monomer ("mer") unit in the copolymer is derived from ethylene in the polymerization reaction and the derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of "copolymer," as used herein, includes terpolymers and the like. An oligomer is typically a polymer having a low molecular weight, such an Mn of less than 25,000 g/mol, or less than 2,500 g/mol, or a low number of mer units, such as 75 mer units or less or 50 mer units or less. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

A "catalyst system" is a combination of at least one catalyst and a support material. The catalyst system may have at least one activator and/or at least one co-activator. When catalyst systems are described as comprising neutral stable forms of the components, it is well understood that the ionic form of the component is the form that reacts with the monomers to produce polymers. For purposes of the present disclosure, "catalyst system" includes both neutral and ionic forms of the components of a catalyst system.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

In the present disclosure, the catalyst may be described as a catalyst precursor, a pre-catalyst, catalyst or a transition metal compound, and these terms are used interchangeably.

An "anionic ligand" is a negatively charged ligand which donates one or more pairs of electrons to a metal ion. A "neutral donor ligand" is a neutrally charged ligand which donates one or more pairs of electrons to a metal ion.

For purposes of the present disclosure in relation to catalysts, the term "substituted" means that a hydrogen group has been replaced with a hydrocarbyl group, a heteroatom, or a heteroatom containing group. For example, methylcyclopentadiene (MeCp) is a Cp group substituted with a methyl group, ethyl alcohol is an ethyl group substituted with an —OH group.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In at least one embodiment, the alkyl group may comprise at least one aromatic group. The term "alkoxy" or "alkoxide" preferably means an alkyl ether or aryl ether radical wherein the term alkyl is a $C_1$ to $C_{10}$ alkyl. Examples of suitable alkyl ether radicals include, but are not limited to, methoxy, ethoxy, n-propoxy, iso-propoxy, n-butoxy, iso-butoxy, sec-butoxy, tert-butoxy, phenoxy, and the like.

The present disclosure describes transition metal complexes. The term complex is used to describe molecules in which an ancillary ligand is coordinated to a central transition metal atom. The ligand is stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal.

When used in the present disclosure, the following abbreviations mean: dme is 1,2-dimethoxyethane, Me is methyl, Ph is phenyl, Et is ethyl, Pr is propyl, iPr is isopropyl, n-Pr is normal propyl, cPr is cyclopropyl, Bu is butyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, sMAO is supported methylalumoxane, p-Me is para-methyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, and Cy is cyclohexyl.

The terms "hydrocarbyl radical," "hydrocarbyl," "hydrocarbyl group," "alkyl radical," and "alkyl" are used interchangeably throughout this disclosure. Likewise, the terms "group", "radical", and "substituent" are also used interchangeably in this disclosure. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least a non-hydrogen group, such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

The term "alkenyl" means a straight-chain, branched-chain, or cyclic hydrocarbon radical having one or more carbon-carbon double bonds. These alkenyl radicals may be substituted. Examples of suitable alkenyl radicals include, but are not limited to, ethenyl, propenyl, allyl, 1,4-butadienyl, cyclopropenyl, cyclobutenyl, cyclopentenyl, cyclohexenyl, cyclooctenyl and the like including their substituted analogues.

The term "aryl" or "aryl group" means a carbon-containing aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., n-butyl, iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

"Complex" as used herein, is also often referred to as catalyst precursor, precatalyst, catalyst, catalyst, transition metal compound, or transition metal complex. These terms are used interchangeably. Activator and cocatalyst are also used interchangeably.

In the present disclosure, a catalyst may be described as a catalyst precursor, a pre-catalyst, catalyst or a transition metal compound, and these terms are used interchangeably. A polymerization catalyst system is a catalyst system that can polymerize monomers into polymer.

The term "continuous" means a system that operates without interruption or cessation for a period of time. For example, a continuous process to produce a polymer would be one where the reactants are continually introduced into one or more reactors and polymer product is continually withdrawn.

Catalysts

In at least one embodiment, the present disclosure provides a catalyst system comprising a catalyst having a metal atom. The catalyst can be a metallocene catalyst. The metal can be a Group 3 through Group 12 metal atom, such as Group 3 through Group 10 metal atoms, or lanthanide Group atoms. The catalyst having a Group 3 through Group 12 metal atom can be monodentate or multidentate, such as bidentate, tridentate, or tetradentate, where a heteroatom of the catalyst, such as phosphorous, oxygen, nitrogen, or sulfur is chelated to the metal atom of the catalyst. Non-limiting examples include bis(phenolate)s. In at least one embodiment, the Group 3 through Group 12 metal atom is selected from Group 5, Group 6, Group 8, or Group 10 metal atoms. In at least one embodiment, a Group 3 through Group 10 metal atom is selected from Cr, Sc, Ti, Zr, Hf, V, Nb, Ta, Mn, Re, Fe, Ru, Os, Co, Rh, Ir, and Ni. In at least one embodiment, a metal atom is selected from Groups 4, 5, and 6 metal atoms. In at least one embodiment, a metal atom is a Group 4 metal atom selected from Ti, Zr, or Hf. The oxidation state of the metal atom can range from 0 to +7, for example +1, +2, +3, +4, or +5, for example +2, +3 or +4.

A catalyst of the present disclosure can be a chromium or chromium-based catalyst. Chromium-based catalysts include chromium oxide ($CrO_3$) and silylchromate catalysts. Chromium catalysts have been the subject of much development in the area of continuous fluidized-bed gas-phase polymerization for the production of polyethylene polymers. Such catalysts and polymerization processes have been described, for example, in U.S. Publication No. 2011/0010938 and U.S. Pat. Nos. 7,915,357; 8,129,484; 7,202,313; 6,833,417; 6,841,630; 6,989,344; 7,504,463; 7,563,851; 8,420,754; and 8,101,691.

Metallocene catalysts as used herein include metallocenes comprising Group 3 to Group 12 metal complexes, preferably Group 4 to Group 6 metal complexes, for example, Group 4 metal complexes. The metallocene catalyst of catalyst systems of the present disclosure may be unbridged metallocene catalysts represented by the formula: $Cp^A Cp^B M'X'_n$, wherein each $Cp^A$ and $Cp^B$ is independently selected from cyclopentadienyl ligands and ligands isolobal to cyclopentadienyl, one or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. R" is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether.

In at least one embodiment, each $Cp^A$ and CpB is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, and hydrogenated versions thereof.

The metallocene catalyst may be a bridged metallocene catalyst represented by the formula: $Cp^A(A)Cp^B M'X'_n$, wherein each $Cp^A$ and $Cp^B$ is independently selected from cyclopentadienyl ligands and ligands isolobal to cyclopentadienyl. One or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. (A) is selected from divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R" is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, germanium, ether, and thioether.

In at least one embodiment, each of $Cp^A$ and $Cp^B$ is independently selected from cyclopentadienyl, n-propylcyclopentadienyl, indenyl, pentamethylcyclopentadienyl, tetramethylcyclopentadienyl, and n-butylcyclopentadienyl.

(A) may be O, S, NR', or $SiR'_2$, where each R' is independently hydrogen or $C_1$-$C_{20}$ hydrocarbyl.

In another embodiment, the metallocene catalyst is represented by the formula:

$T_y Cp_m MG_n X_q$, where Cp is independently a substituted or unsubstituted cyclopentadienyl ligand or substituted or unsubstituted ligand isolobal to cyclopentadienyl. M is a Group 4 transition metal. G is a heteroatom group represented by the formula $JR^*_z$ where J is N, P, O, or S, and $R^*$ is a linear, branched, or cyclic $C_1$-$C_{20}$ hydrocarbyl. z is 1 or 2. T is a bridging group. y is 0 or 1. X is a leaving group. m=1, n=1, 2, or 3, q=0, 1, 2, or 3, and the sum of m+n+q is equal to the oxidation state of the transition metal.

In at least one embodiment, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof.

The metallocene catalyst may be selected from:
bis(1-methyl, 3-n-butyl cyclopentadienyl) zirconium dichloride;
dimethylsilyl bis(tetrahydroindenyl) zirconium dichloride;
bis(n-propylcyclopentadienyl) hafnium dimethyl;
dimethylsilyl (tetramethylcyclopentadienyl)(cyclododecylamido)titanium dimethyl;
dimethylsilyl (tetramethylcyclopentadienyl)(cyclododecylamido)titanium dichloride;
dimethylsilyl (tetramethylcyclopentadienyl)(t-butylamido) titanium dimethyl;
dimethylsilyl (tetramethylcyclopentadienyl)(t-butylamido) titanium dichloride;
μ-$(CH_3)_2$Si(cyclopentadienyl)(1-adamantylamido)M$(R)_2$;
μ-$(CH_3)_2$Si(3-tertbutylcyclopentadienyl)(1-adamantylamido)M$(R)_2$;
μ-$(CH_3)_2$(tetramethylcyclopentadienyl)(1-adamantylamido) M$(R)_2$;
μ-$(CH_3)_2$Si(tetramethylcyclopentadienyl)(1-adamantylamido)M$(R)_2$;
μ-$(CH_3)_2$C(tetramethylcyclopentadienyl)(1-adamantylamido)M$(R)_2$;

μ-(CH$_3$)$_2$Si(tetramethylcyclopentadienyl)(1-tertbutylamido)M(R)$_2$;

μ-(CH$_3$)$_2$Si(fluorenyl)(1-tertbutylamido)M(R)$_2$;

μ-(CH$_3$)$_2$Si(tetramethylcyclopentadienyl)(1-cyclododecylamido)M(R)$_2$;

μ-(C$_6$H$_5$)$_2$C(tetramethylcyclopentadienyl)(1-cyclododecylamido)M(R)$_2$;

μ-(CH$_3$)$_2$Si(η$^5$-2,6,6-trimethyl-1,5,6,7-tetrahydro-s-indacen-1-yl)(tertbutylamido)M(R)$_2$;

where M is selected from Ti, Zr, and Hf; and R is selected from halogen or C$_1$ to C$_5$ alkyl.

In at least one embodiment, the catalyst is a bis(phenolate) catalyst represented by Formula (I):

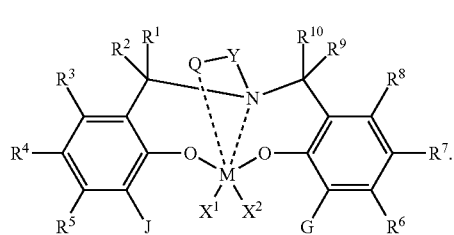

(I)

M is a Group 4 metal. X$^1$ and X$^2$ are independently a univalent C$_1$-C$_{20}$ hydrocarbyl, C$_1$-C$_{20}$ substituted hydrocarbyl, a heteroatom or a heteroatom-containing group, or X$^1$ and X$^2$ join together to form a C$_4$-C$_{62}$ cyclic or polycyclic ring structure. R$^1$, R$^2$, R$^3$, R$^4$, R$^5$, R$^6$, R$^7$, R$^8$, R$^9$, and R$^{10}$ is independently hydrogen, C$_1$-C$_{40}$ hydrocarbyl, C$_1$-C$_{40}$ substituted hydrocarbyl, a heteroatom or a heteroatom-containing group, or two or more of R$^1$, R$^2$, R$^3$, R$^4$, R$^5$, R$^6$, R$^7$, R$^8$, R$^9$, or R$^{19}$ are joined together to form a C$_4$-C$_{62}$ cyclic or polycyclic ring structure, or a combination thereof. Q is a neutral donor group. J is heterocycle, a substituted or unsubstituted C$_7$-C$_{60}$ fused polycyclic group, where at least one ring is aromatic and where at least one ring, which may or may not be aromatic, has at least five ring atoms. G is as defined for J or may be hydrogen, C$_2$-C$_{60}$ hydrocarbyl, C$_1$-C$_{60}$ substituted hydrocarbyl, or may independently form a C$_4$-C$_{60}$ cyclic or polycyclic ring structure with R$^6$, R$^7$, or R$^8$ or a combination thereof. Y is divalent C$_1$-C$_{20}$ hydrocarbyl or divalent C$_1$-C$_{20}$ substituted hydrocarbyl or (-Q*-Y—) together form a heterocycle. Heterocycle may be aromatic and/or may have multiple fused rings.

In at least one embodiment, the catalyst represented by Formula (I) is:

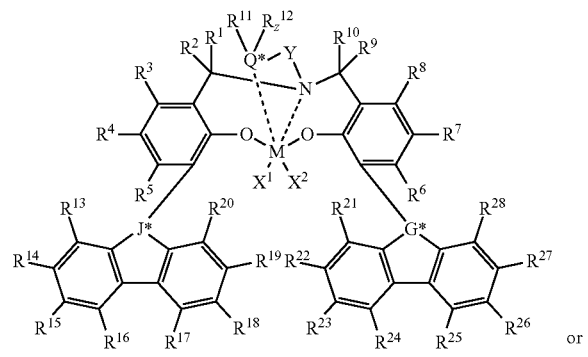

or

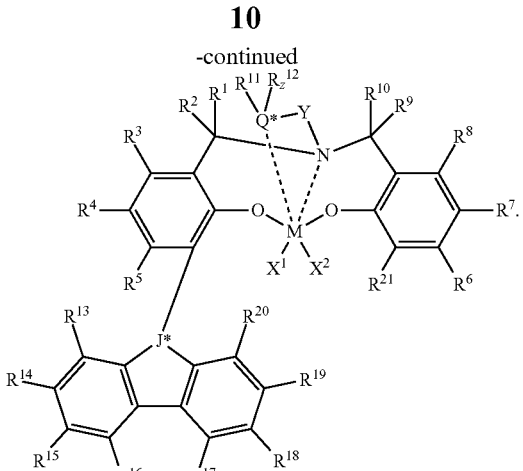

M is Hf, Zr, or Ti. X$^1$, X$^2$, R$^1$, R$^2$, R$^3$, R$^4$, R$^5$, R$^6$, R$^7$, R$^8$, R$^9$, R$^{10}$, and Y are as defined for Formula (I). R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$, and R$^{28}$ is independently a hydrogen, C$_1$-C$_{40}$ hydrocarbyl, C$_1$-C$_{40}$ substituted hydrocarbyl, a functional group comprising elements from Groups 13 to 17, or two or more of R$^1$, R$^2$, R$^3$, R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$, and R$^{28}$ may independently join together to form a C$_4$-C$_{62}$ cyclic or polycyclic ring structure, or a combination thereof. R$^{11}$ and R$^{12}$ may join together to form a five- to eight-membered heterocycle. Q* is a group 15 or 16 atom. z is 0 or 1. J* is CR" or N, and G* is CR" or N, where R" is C$_1$-C$_{20}$ hydrocarbyl or carbonyl-containing C$_1$-C$_{20}$ hydrocarbyl. z=0 if Q* is a group 16 atom, and z=1 if Q* is a group 15 atom.

In at least one embodiment, the first catalyst represented by Formula (I) is:

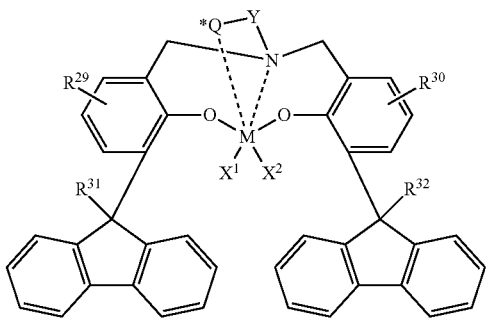

Y is a divalent C$_1$-C$_3$ hydrocarbyl. Q* is NR$_2$, OR, SR, PR$_2$, where R is as defined for R$^1$ represented by Formula (I). M is Zr, Hf, or Ti. X$^1$ and X$^2$ is independently as defined for Formula (I). R$^{29}$ and R$^{39}$ is independently C$_1$-C$_{40}$ hydrocarbyl. R$^{31}$ and R$^{32}$ is independently linear C$_1$-C$_{20}$ hydrocarbyl, benzyl, or tolyl.

Catalyst systems of the present disclosure may include a second catalyst having a Group 3 through Group 12 metal atom or lanthanide metal atom and having a chemical structure different than the first catalyst of the catalyst system. For purposes of the present disclosure one catalyst is considered different from another if they differ by at least one atom. For example "bisindenyl zirconium dichloride" is different from (indenyl)(2-methylindenyl) zirconium dichloride" which is different from "(indenyl)(2-methylindenyl)

hafnium dichloride." Catalysts that differ only by isomer are considered the same for purposes of this disclosure, e.g., rac-dimethylsilylbis(2-methyl 4-phenyl)hafnium dimethyl is considered to be the same as meso-dimethylsilylbis(2-methyl 4-phenyl)hafnium dimethyl.

In at least one embodiment, two or more different catalysts are present in the catalyst system used herein. In at least one embodiment, two or more different catalysts are present in the reaction zone where the process(es) described herein occur. When two transition metal catalysts are used in one reactor as a mixed catalyst system, the two transition metal compounds are preferably chosen such that the two are compatible. Any suitable screening method, such as by $^1$H or $^{13}$C NMR, can be used to determine which transition metal compounds are compatible. It is preferable to use the same activator for the transition metal compounds; however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

The first catalyst and the second catalyst may be used in any ratio (A:B). The first catalyst may be (A) if the second catalyst is (B). Alternatively, the first catalyst may be (B) if the second catalyst is (A). Preferred molar ratios of (A) transition metal compound to (B) transition metal compound fall within the range of (A:B) about 1:1000 to about 1000:1, such as from about 1:100 to about 500:1, such as from about 1:10 to about 200:1, such as from about 1:1 to about 100:1, and alternatively 1:1 to 75:1, and alternatively 5:1 to 50:1. The particular ratio chosen will depend on the exact catalysts chosen, the method of activation, and the end product desired. In a particular embodiment, when using the two catalysts, where both are activated with the same activator, useful mole percents, based upon the molecular weight of the catalysts, are from about 10 to about 99.9% of (A) to about 0.1 to about 90% of (B), such as from about 25 to about 99% (A) to about 0.5 to about 50% (B), such as from about 50 to about 99% (A) to about 1 to about 25% (B), such as from about 75 to about 99% (A) to about 1 to about 10% (B).

Activators

Catalyst systems of the present disclosure may be formed by combining the above catalysts with activators in any manner known from the literature including by supporting them for use in slurry or gas phase polymerization. Activators are defined to be any compound which can activate any one of the catalysts described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing noncoordinating or weakly coordinating anion.

Non-limiting species of noncoordinating or weakly coordinating anion activator include N,N-dimethylanilinium tetra(perfluorophenyl)borate, N,N-dimethylanilinium tetrakis (perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3, 5-bis(trifluoromethyl)phenyl)borate, triphenylcarbenium tetra(perfluorophenyl)borate, trimethylammonium tetrakis (perfluoronaphthyl)borate, triethylammonium tetrakis(perfluoronaphthyl)borate, tripropylammonium tetrakis(perfluoronaphthyl)borate, tri(n-butyl)ammonium tetrakis (perfluoronaphthyl)borate, tri(t-butyl)ammonium tetrakis (perfluoronaphthyl)borate, N,N-diethylanilinium tetrakis (perfluoronaphthyl)borate, N,N-dimethyl-(2,4,6-trimethylanilinium) tetrakis(perfluoronaphthyl)borate, and tropillium tetrakis(perfluoronaphthyl)borate.

Alumoxane Activators

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Optional Scavengers or Co-Activators

In addition to these activator compounds, catalyst systems of the present disclosure may include scavengers or co-activators. Scavengers or co-activators include aluminum alkyl or organoaluminum compounds, for example, trimethylaluminum, triethylaluminum, triisobutylaluminum, tri-n-hexylaluminum, tri-n-octylaluminum, and diethyl zinc.

Support Materials

In at least one embodiment, a catalyst system comprises an inert support material. The supported material may be a porous support material, for example, talc, and inorganic oxides. Other support materials include zeolites, clays, organoclays, or any other organic or inorganic support material and the like, or mixtures thereof.

In at least one embodiment, the support material is an inorganic oxide in a finely divided form. Suitable inorganic oxide materials for use in catalyst systems herein include Groups 2, 4, 13, and 14 metal oxides, such as silica, alumina, silica-alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, silica clay, silicon oxide clay, and the like. Also, combinations of these support materials may be used, for example, silica-chromium, silica-alumina, silica-titania, and the like. In at least one embodiment, the support material is selected from $Al_2O_3$, $ZrO_2$, $SiO_2$, $SiO_2/Al_2O_3$, silica clay, silicon oxide/clay, or mixtures thereof. The support material may be fluorided.

As used herein, the phrases "fluorided support" and "fluorided support composition" mean a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. Suitable fluorine containing compounds include, but are not limited to, inorganic fluorine containing compounds and/or organic fluorine containing compounds.

Fluorine compounds suitable for providing fluorine for the support may be organic or inorganic fluorine compounds and are desirably inorganic fluorine containing compounds. Such inorganic fluorine containing compounds may be any compound containing a fluorine atom as long as it does not contain a carbon atom. Particularly desirable are inorganic fluorine-containing compounds selected from $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$, $NH_4HF_2$, and combinations thereof. In at least one embodiment, ammonium hexafluorosilicate and ammonium tetrafluoroborate are used.

It is preferred that the support material, most preferably an inorganic oxide, has a surface area between about 10 and about 700 $m^2/g$, pore volume between about 0.1 and about 4.0 cc/g and average particle size between about 5 and about 500 μm. In at least one embodiment, the surface area of the support material is between about 50 and about 500 $m^2/g$, pore volume between about 0.5 and about 3.5 cc/g and average particle size between about 10 and about 200 μm. The surface area of the support material may be between about 100 and about 400 $m^2/g$, pore volume between about 0.8 and about 3.0 cc/g and average particle size between about 5 and about 100 μm. The average pore size of the support material may be between about 10 and about 1000 Å, such as between about 50 and about 500 Å, such as between about 75 and about 350 Å. In at least one embodiment, the support material is a high surface area, amorphous silica (surface area=300 $m^2$/gm; pore volume of 1.65 $cm^3$/gm). Non-limiting example silicas are marketed under the tradenames of DAVISON 952 or DAVISON 955 by the Davison Chemical Division of W.R. Grace and Company. In other embodiments, DAVISON 948 is used.

The support material should be dry, that is, free of absorbed water. Drying of the support material can be effected by heating or calcining at between about 100° C. and about 1000° C., such as at least about 600° C. When the support material is silica, it is heated to at least 200° C., such as between about 200° C. and about 850° C., such as about 600° C.; and for a time between about 1 minute and about 100 hours, between 5 minutes and about 12 hours, such as between about 1 hours and about 72 hours. The calcined support material should have at least some reactive hydroxyl (OH) groups to produce supported catalyst systems of the present disclosure. The calcined support material is then contacted with at least one polymerization catalyst system comprising, for example, at least one catalyst and an activator.

Catalyst System Formation:

Embodiments of the present disclosure include methods for preparing a catalyst system including contacting at least one aromatic hydrocarbon, at least one activator, at least one catalyst having a Group 3 through Group 12 metal atom or lanthanide metal atom, and at least one catalyst support to form a first mixture, reducing the amount of the aromatic hydrocarbon to form a second mixture having 1.5 wt % or less of aromatic hydrocarbon based on the total weight of the second mixture, and adding a saturated hydrocarbon to the second mixture to form a third mixture which is a catalyst system of the present disclosure. The catalyst having a Group 3 through Group 12 metal atom or lanthanide metal atom can be a metallocene catalyst comprising a Group 4 metal.

In at least one embodiment, reducing the amount of aromatic hydrocarbon comprises applying heat at about 80° C. or less to the first and/or second mixture, such as at about 70° C. or less, about 65° C. or less, about 60° C. or less, or about 55° C. or less. After reducing the amount of aromatic hydrocarbon, the second mixture can have 0.5 wt % or less aromatic hydrocarbon based on the total weight of the second mixture, such as about 0 wt % based on the total weight of the second mixture.

The support material can be slurried in a non-polar solvent and the resulting slurry is contacted with a solution of at least one catalyst and an activator. In at least one embodiment, the slurry of the support material is first contacted with the activator for a period of time between about 0.5 hours and about 24 hours, such as between about 2 hours and about 16 hours, or between about 4 hours and about 8 hours. The solution of the catalyst is then contacted with the support/activator. In at least one embodiment, the supported catalyst system is generated in situ. In at least one embodiment, a slurry of the support material is first contacted with the catalyst for a period of time between about 0.5 hours and about 24 hours, such as between about 2 hours and about 16 hours, or between about 4 hours and about 8 hours. The slurry of the supported catalyst(s) is then contacted with the activator solution.

The mixture of the catalyst, activator and support may be heated to between about 0° C. and about 70° C., such as between about 23° C. and about 60° C., for example, room temperature. Contact times may be between about 0.5 hours and about 24 hours, such as between about 2 hours and about 16 hours, or between about 4 hours and about 8 hours.

Suitable non-polar solvents are materials in which all of the reactants used herein, e.g., the activator, and the catalyst, are at least partially soluble and which are liquid at reaction temperatures. Non-limiting example non-polar solvents are alkanes, such as isopentane, hexane, n-heptane, octane, nonane, and decane, cycloalkanes, such as cyclohexane, aromatics, such as benzene, toluene, xylene, and ethylbenzene.

Toluene can be charged into a reactor, followed by an activator, such as a solution of activator dissolved in toluene. Catalyst can then be charged into the reactor, such as a solution of catalyst in toluene. The mixture can be stirred at a temperature, such as room temperature. Support material can then be added to the mixture with stirring. Additional toluene may be added to the mixture to form a slurry having a desired consistency, such as from about 2 cc/g of silica to about 6 cc/g silica, such as about 4 cc/g. Toluene is then removed. Removing toluene dries the mixture and may be performed under a vacuum atmosphere, purge with inert atmosphere, heating of the mixture, or combinations thereof. For heating of the mixture, any suitable temperature can be used that evaporates toluene. It is to be understood that reduced pressure under vacuum will lower the boiling point of toluene depending on the pressure of the reactor. Toluene removal temperatures can be from about 10° C. to about 200° C., such as from about 40° C. to about 140° C., such as from about 60° C. to about 120° C., for example about 80° C. or less, such as about 70° C. or less. In at least one embodiment, removing toluene includes applying heat, applying vacuum, and applying nitrogen purged from bottom of the vessel by bubbling nitrogen through the mixture. The mixture is dried (i.e., toluene removed) until the mixture contained less than 1.5 wt % toluene based on the total weight of the dried mixture. The dried mixture can then be allowed to come to room temperature. A saturated hydrocarbon can then be added to the dried mixture (and can be stirred) to form a catalyst system. The catalyst system regains flowability lost due to removing toluene from the mixture of catalyst system components. The amount of saturated hydrocarbon in the catalyst system can be (based on the total weight of the catalyst system) from about 0.1 wt % to about 20 wt %, such as from about 0.3 wt % to about 15 wt %, such as from about 0.4 wt % to about 10 wt %, such as from about 0.5 wt % to about 5 wt %, such as from about 1 wt % to about 3 wt %.

The saturated hydrocarbon can be a linear or cyclic hydrocarbon. Saturated hydrocarbons include propane, butane, pentane, hexane, heptane, octane, nonane, decane, undecane, dodecane, tridecane, tetradecane, pentadecane, hexadecane, heptadecane, octadecane, nonadecane, and 'iso'-forms thereof, or mixtures thereof. Cyclic hydrocarbons include cyclobutane, cyclopentane, cyclohexane, cycloheptane, cyclooctane, and cyclononane.

Polymerization Processes

In at least one embodiment of the present disclosure, a method includes polymerizing olefins to produce a polyolefin composition by contacting at least one olefin with a catalyst system of the present disclosure and obtaining the polyolefin composition. Polymerization may be conducted at a temperature of from about 0° C. to about 300° C., at a pressure in the range of from about 0.35 MPa to about 10 MPa, and/or at a time up to about 300 minutes.

Embodiments of the present disclosure include polymerization processes where monomer (such as ethylene or propylene), and optionally comonomer, are contacted with a catalyst system comprising at least one catalyst and an activator, as described above. The at least one catalyst and activator may be combined in any order, and are combined typically prior to contact with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene, isomers thereof, or mixtures thereof. In a preferred embodiment, olefins include a monomer that is ethylene and one or more optional comonomers comprising one or more ethylene or $C_4$ to $C_{40}$ olefin, preferably $C_4$ to $C_{20}$ olefin, or preferably $C_6$ to $C_{12}$ olefin. The olefin monomers may be linear, branched, or cyclic. The olefin monomers may be strained or unstrained, monocyclic or polycyclic, and may include one or more heteroatoms and/or one or more functional groups.

Exemplary olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and substituted derivatives thereof, preferably norbornene, norbornadiene, dicyclopentadiene, and mixtures thereof.

In at least one embodiment, one or more dienes are present in a polymer produced herein at up to about 10 wt %, such as from about 0.00001 to about 1.0 wt %, such as from about 0.002 to about 0.5 wt %, such as from about 0.003 to about 0.2 wt %, based upon the total weight of the composition. In at least one embodiment, about 500 ppm or less of diene is added to the polymerization, such as about 400 ppm or less, such as about 300 ppm or less. In at least one embodiment, at least about 50 ppm of diene is added to the polymerization, or about 100 ppm or more, or 150 ppm or more.

Diolefin monomers include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). In at least one embodiment, the diolefin monomers are linear di-vinyl monomers, such as those containing from 4 to 30 carbon atoms. Non-limiting examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Non-limiting example cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, and/or gas phase polymerization process can be used. Such processes can be run in a batch, semi-batch, or continuous mode. Homogeneous polymerization processes and slurry processes are preferred. (A homogeneous polymerization process is defined to be a process where at least about 90 wt % of the product is soluble in the reaction media.) A bulk homogeneous process is particularly preferred. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein, the term "slurry polymerization process" means a polymerization process where a supported catalyst is used and monomers are polymerized on the supported catalyst particles. At least 95 wt % of polymer products derived from the supported catalyst are in granular form as solid particles (not dissolved in the diluent). Methods of the present disclosure may include introducing the catalyst system into a reactor as a slurry.

Suitable diluents/solvents for polymerization include non-coordinating, inert liquids. Non-limiting examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including, but not limited to, ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexane, isohexane, heptane, octane, dodecane, or mixtures thereof; cyclic and alicyclic hydrocarbons, such as cyclohexane, cycloheptane, methylcyclohexane, methylcycloheptane, or mixtures thereof. In another embodiment, the solvent is not aromatic, and aromatics are present in the solvent at less than about 1 wt %, such as less than about 0.5 wt %, such as about 0 wt % based upon the weight of the solvents.

In at least one embodiment, the feed concentration of the monomers and comonomers for the polymerization is about 60 vol % solvent or less, preferably about 40 vol % or less, or about 20 vol % or less, based on the total volume of the feedstream. Preferably the polymerization is run in a bulk process.

Preferred polymerizations can be run at any temperature and/or pressure suitable to obtain the desired polyolefins. Typical temperatures and/or pressures include a temperature from about 0° C. to about 300° C., such as from about 20° C. to about 200° C., such as from about 35° C. to about 150° C., such as from about 40° C. to about 120° C., such as from about 45° C. to about 80° C.; and at a pressure from about 0.35 MPa to about 10 MPa, such as from about 0.45 MPa to about 6 MPa, or preferably from about 0.5 MPa to about 4 MPa.

In a typical polymerization, the run time of the reaction is up to about 300 minutes, such as from about 5 to about 250 minutes, such as from about 10 to about 120 minutes.

Hydrogen, may be added to a reactor for molecular weight control of polyolefins. In at least one embodiment, hydrogen is present in the polymerization reactor at a partial pressure of from about 0.001 and 50 psig (0.007 to 345 kPa), such as from about 0.01 to about 25 psig (0.07 to 172 kPa), such as from about 0.1 and 10 psig (0.7 to 70 kPa). In one embodiment, 600 ppm or less of hydrogen is added, or 500 ppm or less of hydrogen is added, or 400 ppm or less or 300 ppm or less. In other embodiments, at least 50 ppm of hydrogen is added, or 100 ppm or more, or 150 ppm or more.

In an alternative embodiment, the activity of the catalyst is at least about 50 g/mmol/hour, such as about 500 or more g/mmol/hour, such as about 5,000 or more g/mmol/hr, such as about 50,000 or more g/mmol/hr. In an alternative embodiment, the conversion of olefin monomer is at least about 10%, based upon polymer yield (weight) and the weight of the monomer entering the reaction zone, such as about 20% or more, such as about 30% or more, such as about 50% or more, such as about 80% or more.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa) is conducted in an aliphatic hydrocarbon solvent (such as isobutane, butane, pentane, isopentane, hexanes, isohexane, heptane, octane, dodecane, and mixtures thereof; cyclic or alicyclic hydrocarbons, such as cyclohexane, cycloheptane, methylcyclohexane, methylcycloheptane, or mixtures thereof; preferably where aromatics are present in the solvent at less than 1 wt %, preferably less than 0.5 wt %, preferably at 0 wt % based upon the weight of the solvents); 4) wherein the catalyst system used in the polymerization comprises less than 0.5 mol % alumoxane, preferably 0 mol % alumoxane. Alternatively, the alumoxane is present at a molar ratio of aluminum to transition metal of a catalyst of less than 500:1, preferably less than 300:1, preferably less than 100:1, preferably less than 1:1; 5) the polymerization preferably occurs in one reaction zone; 6) the productivity of the catalyst is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); and 7) optionally, scavengers (such as trialkyl aluminum compounds) are absent (e.g., present at zero mol %). Alternatively, the scavenger is present at a molar ratio of scavenger metal to transition metal of less than 100:1, preferably less than 50:1, preferably less than 15:1, preferably less than 10:1; and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst. A "reaction zone", also referred to as a "polymerization zon", is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Chain transfer agents may be alkylalumoxanes, a compound represented by the formula $AlR_3$, $ZnR_2$ (where each R is, independently, a $C_1$-$C_8$ aliphatic radical, preferably methyl, ethyl, propyl, butyl, penyl, hexyl, heptyl, octyl or an isomer thereof) or a combination thereof, such as diethyl zinc, methylalumoxane, trimethylaluminum, triisobutylaluminum, trioctylaluminum, or a combination thereof.

Polyolefin Products

The present disclosure also relates to polyolefin compositions, such as resins, produced by the catalyst systems and polymerization processes of the present disclosure. Polyolefins of the present disclosure can have 0.01 mg/m² or less toluene.

In at least one embodiment, a process includes utilizing a catalyst system of the present disclosure to produce propylene homopolymers or propylene copolymers, such as propylene-ethylene and/or propylene-alphaolefin (preferably $C_3$ to $C_{20}$) copolymers (such as propylene-hexene copolymers or propylene-octene copolymers) having an Mw/Mn of greater than about 1, such as greater than about 2, such as greater than about 3, such as greater than about 4.

In at least one embodiment, a process includes utilizing a catalyst system of the present disclosure to produce olefin polymers, preferably polyethylene and polypropylene homopolymers and copolymers. In at least one embodiment, the polymers produced herein are homopolymers of ethylene or copolymers of ethylene preferably having from about 0 and 25 mol % of one or more $C_3$ to $C_{20}$ olefin comonomer (such as from about 0.5 and 20 mol %, such as from about 1 to about 15 mol %, such as from about 3 to about 10 mol %).

Polymers produced herein may have an Mw of from about 5,000 to about 1,000,000 g/mol (such as from about 25,000 to about 750,000 g/mol, such as from about 50,000 to about 500,000 g/mol), and/or an Mw/Mn of from about 1 to about 40 (such as from about 1.2 to about 20, such as from about 1.3 to about 10, such as from about 1.4 to about 5, such as from about 1.5 to about 4, such as from about 1.5 to about 3).

Blends

In at least one embodiment, the polymer (such as polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as polyethylene or polypropylene) is present in the above blends, at from about 10 to about 99 wt %, based upon the weight of total polymers in the blend, such as from about 20 to about 95 wt %, such as from about 30 to about 90 wt %, such as from about 40 to about 90 wt %, such as from about 50 to about 90 wt %, such as from about 60 to about 90 wt %, such as from about 70 to about 90 wt %.

Blends of the present disclosure may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

Blends of the present disclosure may be formed using conventional equipment and methods, such as by dry blending the individual components, such as polymers, and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anticling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; mixtures thereof, and the like.

In at least one embodiment, a polyolefin composition, such as a resin, that is a multi-modal polyolefin composition comprises a low molecular weight fraction and/or a high molecular weight fraction. In at least one embodiment, the high molecular weight fraction is produced by the catalyst represented by Formula (I). The low molecular weight fraction may be produced by a second catalyst that is a bridged or unbridged metallocene catalyst, as described above. The high molecular weight fraction may be polypropylene, polyethylene, and copolymers thereof. The low molecular weight fraction may be polypropylene, polyethylene, and copolymers thereof.

In at least one embodiment, the polyolefin composition produced by a catalyst system of the present disclosure has a comonomer content from about 3 wt % to about 15 wt %, such as from about 4 wt % and bout 10 wt %, such as from about 5 wt % to about 8 wt %. In at least one embodiment, the polyolefin composition produced by a catalyst system of the present disclosure has a polydispersity index of from about 2 to about 6, such as from about 2 to about 5.

Films

Any of the foregoing polymers, such as the foregoing polyethylenes or blends thereof, may be used in a variety of end-use applications. Such applications include, for example, mono- or multi-layer blown, extruded, and/or shrink films. These films may be formed by any suitable extrusion or coextrusion techniques, such as a blown bubble film processing technique, where the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

The films may vary in thickness depending on the intended application; however, films of a thickness from 1 µm to 50 µm may be suitable. Films intended for packaging are usually from 10 µm to 50 µm thick. The thickness of the sealing layer is typically 0.2 µm to 50 µm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

All reagents were obtained from Sigma Aldrich (St. Louis, Mo.) and used as obtained, unless stated otherwise. All solvents were anhydrous. All reactions were performed under an inert nitrogen atmosphere, unless otherwise stated. All deuterated solvents were obtained from Cambridge Isotopes (Cambridge, Mass.) and dried over 3 Angstrom molecular sieves before use.

Funnel Test Used for Measuring Flow Properties

The following procedure outlines the steps for the funnel test followed to measure catalyst flowability. These steps were performed under anaerobic conditions in a nitrogen atmosphere. Each funnel has a narrow opening at a first end of the funnel and a broad opening at a second end opposite the first end. The narrow opening of a funnel has a diameter of 14 mm, 12 mm, 10 mm, or 7 mm. The steps were as follows:
1) Twenty grams of the catalyst system sample to be measured is weighed into a funnel with the narrow opening covered with a cover to prevent flow of catalyst system;
2) The stopwatch is started when the cover is removed;
3) The stopwatch is stopped when the entire sample has passed through the narrow opening;
4) The stopwatch time is recorded in the lab notebook, and the procedure is repeated using a funnel having a different sized narrow opening. If catalyst does not flow through a certain size funnel, there are no further tests using smaller size funnel.

Preparation of Catalyst Systems

Comparative Example 1: Dimethylsilyl bis(tetrahydroindenyl) Zirconium Dichloride and Toluene 1.5 wt %

Into a 2 gallon (7.57 liters) reactor was charged first with 2.0 liters of toluene then, 1060 g of 30 wt % methylalumoxane solution in toluene (available from Albemarle, Baton Rouge, La.), followed by 19.0 g of dimethylsilyl bis(tetrahydroindenyl) zirconium dichloride as a 10% solution in toluene. The mixture was stirred for 60 minutes at about 23° C. after which 850 g of silica (ES70 silica dehydrated at 600° C. available from PQ Corp, PA) was added to the liquid with agitation. Stirring speed was increased for approximately 10 minutes to insure dispersion of the silica into the liquid and then toluene was added to make up a slurry of liquid to solid having a consistency of 4 cc/g of silica. 250 g Irgastat™ AS990 additive 10 wt % in toluene was added. The mixture was stirred for 30 minutes. Drying was then initiated by vacuum and nitrogen purged at 160° F. (71.1° C.) until the mixture contained ~1.5 wt % toluene based on the total weight of the dried mixture to form the catalyst system. The dried mixture was allowed to cool to about 23° C.

Comparative Example 2: Dimethylsilyl bis(tetrahydroindenyl) Zirconium Dichloride and Toluene 0 wt %

60 g of the catalyst system of Comparative Example 1 was placed into a round bottom flask and connected to a rotary evaporator. The catalyst system was dried at 70° C. under full vacuum for about 6 hours until toluene remaining in the catalyst system was less than 1000 ppm.

Example 1: Dimethylsilyl bis(tetrahydroindenyl) Zirconium Dichloride and Isopentane 3.0 wt %

25 g of the catalyst system of Comparative Example 2 was placed into a round bottom flask. Anhydrous isopentane (0.75 g) was then added and stirred at 45° C. for 1 hour.

Example 2: Dimethylsilyl bis(tetrahydroindenyl) Zirconium Dichloride and Hexane 1.5 wt %

60 g of the catalyst system of Comparative Example 1 was placed into a round bottom flask and connected to a rotary evaporator. The catalyst system was dried at 70° C. under full vacuum for about 6 hours until toluene remaining in the catalyst system was less than 1000 ppm. 25 g of this catalyst system was placed into a new round bottom flask. Anhydrous n-hexane (0.375 g) was added. The bottle was sealed, and this catalyst system was mixed at 70° C. for 1 hour.

Table 1 illustrates flowability data for catalyst systems: Example 1, Example 2, Comparative Example 1, and Comparative Example 2. As shown in Table 1, catalyst systems having 3 wt % isopentane (Example 1) or 1.5 wt % hexane (Example 2) provide flowable catalyst systems through, for example, 10 mm funnel narrow ends, which is deemed an adequate flowability for injection of a catalyst system into a polyolefin gas phase reactor.

TABLE 1

| Catalyst System | Flow time (seconds) through 7 mm Funnel | Flow time (seconds) through 10 mm Funnel | Flow time (seconds) through 12 mm Funnel | Flow time (seconds) through 14 mm Funnel |
|---|---|---|---|---|
| Example 1 | 37.12 | 6.01 | 1.64 | 1.26 |
| Example 2 | No flow | 15.76 | 2.87 | 1.84 |
| Comparative Example 1 | 182 | 3.63 | 1.69 | 1.27 |
| Comparative Example 2 | No flow | No flow | No flow | No flow |

Comparative Example 3: bis(1-methyl, 3-n-butyl Cyclopentadienyl) Zirconium Dichloride and Toluene 1.5 wt %

Into a 2 gallon (7.57 liters) reactor was charged first with 2.0 liters of toluene then, 1060 g of 30 wt % methylalumoxane solution in toluene (available from Albemarle, Baton Rouge, La.), followed by 23.1 g of bis(1-methyl, 3-n-butyl cyclopentadienyl) zirconium dichloride as a 10% solution in toluene. The mixture was stirred for 60 minutes at about 23° C. after which 850 g of silica (Davison 948 silica dehydrated at 600° C. available from W. R. Grace, Davison Chemical Division, Baltimore, Md.) was added to the liquid with agitation. Stirring speed was increased for approximately 10 minutes to insure dispersion of the silica into the liquid and toluene was added to make up a slurry of liquid to solid having a consistency of 4 cc/g of silica. 62.5 g Irgastat™ AS990 additive 10 wt % in toluene was added. The mixture was stirred for 30 minutes. Drying was then initiated by vacuum and nitrogen purged at 160° F. (71.1° C.) until the mixture contained ~1.5 wt % toluene based on the total weight of the dried mixture to form the catalyst system. The dried mixture was allowed to cool to about 23° C.

Comparative Example 4: bis(1-methyl, 3-n-butyl Cyclopentadienyl) Zirconium Dichloride and Toluene 0 wt %

60 g of the catalyst system of Comparative Example 3 was placed into a round bottom flask and connected to a rotary evaporator. The catalyst system was dried at 70° C. under full vacuum for about 6 hours until toluene remaining in the catalyst system was less than 1000 ppm.

Example 3: bis(1-methyl, 3-n-butyl Cyclopentadienyl) Zirconium Dichloride and Hexane 1.5 wt %

25 g of the catalyst system of Comparative Example 4 was placed into a round bottom flask and connected to a rotary evaporator. Anhydrous n-hexane (0.375 g) was added. The bottle was sealed, and this catalyst system was mixed at 70° C. for 1 hour.

Table 2 illustrates flowability data for catalyst systems: Example 3, Comparative Example 3, and Comparative Example 4. As shown in Table 2, catalyst systems having 1.5 wt % hexane (Example 3) provide flowable catalyst systems through, for example, 10 mm funnel narrow ends, which is deemed an adequate flowability for injection of a catalyst system into a polyolefin gas phase reactor.

TABLE 2

| Catalyst System | Flow time (seconds) through 7 mm Funnel | Flow time (seconds) through 10 mm Funnel | Flow time (seconds) through 12 mm Funnel | Flow time (seconds) through 14 mm Funnel |
| --- | --- | --- | --- | --- |
| Example 3 | No flow | 7.89 | 3.85 | 2.19 |
| Comparative Example 3 | No flow | 14.63 | 3.76 | 1.72 |
| Comparative Example 4 | No flow | 10.60 | 4.54 | 2.22 |

Comparative Example 5: bis(n-propylcyclopentadienyl) Hafnium Dimethyl and Toluene 1.5 wt %

Into a 2 gallon (7.57 liters) reactor was charged first with 2.0 liters of toluene then, 1060 g of 30 wt % methylalumoxane solution in toluene (available from Albemarle, Baton Rouge, La.), followed by 23.0 g of bis(n-propylcyclopentadienyl) hafnium dimethyl as a 25% solution in toluene. The mixture was stirred for 60 minutes at about 23° C. after which 850 g of silica (ES70 silica dehydrated at 600° C. available from PQ Corp, PA) was added to the liquid with agitation. Stirring speed was increased for approximately 10 minutes to insure dispersion of the silica into the liquid and then toluene was added to make up a slurry of liquid to solid having a consistency of 4 cc/g of silica. Drying was then initiated by vacuum and nitrogen purged at 160° F. (71.1° C.) until the mixture contained ~1.5 wt % toluene based on the total weight of the dried mixture to form the catalyst system. The dried mixture was allowed to cool to about 23° C.

Comparative Example 6: bis(n-propylcyclopentadienyl) Hafnium Dimethyl and Toluene 0 wt %

60 g of the catalyst system of Comparative Example 5 was placed into a round bottom flask and connected to a rotary evaporator. The catalyst system was dried at 70° C. under full vacuum for about 6 hours until toluene present in the catalyst system was 1000 ppm or less.

Example 4: bis(n-propylcyclopentadienyl) Hafnium Dimethyl and Isopentane 3.0 wt %

25 g of the catalyst system of Comparative Example 6 was placed into a round bottom flask. Anhydrous isopentane (0.75 g) was added. The bottle was sealed, and this catalyst system was mixed at 45° C. for 1 hour.

Example 5: bis(n-propylcyclopentadienyl) Hafnium Dimethyl and Isopentane 1.5 wt %

25 g of the catalyst system of Comparative Example 6 was placed into a round bottom flask. Anhydrous isopentane (0.375 g) was added. The bottle was sealed, and this catalyst system was mixed at 45° C. for 1 hour.

Table 3 illustrates flowability data for catalyst systems: Example 4, Example 5, Comparative Example 5, and Comparative Example 6. As shown in Table 3, catalyst systems having 3 wt % isopentane (Example 4) or 1.5 wt % isopentane (Example 5) provide flowable catalyst systems through, for example, 10 mm funnel narrow ends, which is deemed an adequate flowability for injection of a catalyst system into a polyolefin gas phase reactor. Furthermore, catalyst systems having 3 wt % isopentane (Example 4) or 1.5 wt % isopentane (Example 5) provide increased flowability at 7 mm funnel narrow ends as compared to catalyst systems having 1.5 wt % toluene (Comparative Example 5) and catalyst systems having 0 wt % toluene (Comparative Example 6).

TABLE 3

| Catalyst System | Flow time (seconds) through 7 mm Funnel | Flow time (seconds) through 10 mm Funnel | Flow time (seconds) through 12 mm Funnel | Flow time (seconds) through 14 mm Funnel |
| --- | --- | --- | --- | --- |
| Example 4 | 20.32 | 2.52 | 1.28 | 1.1 |
| Example 5 | 3.97 | 1.79 | 1.19 | 0.99 |
| Comparative Example 5 | 43.37 | 2.4 | 1.49 | 1.22 |
| Comparative Example 6 | No flow | No flow | 4.34 | 1.99 |

Comparative Example 7

A saturated hydrocarbon mineral oil (which is >$C_{40}$ hydrocarbon material) was added to various catalyst systems containing the activator, methyl aluminum oxide, before removing toluene. The toluene was then removed as described above. It was observed that methyl aluminum oxide precipitated upon removal of the toluene. Such a catalyst system would present many challenges for commercial operations due to the activator's precipitation, thus, limiting its usefulness.

Overall, it has been discovered that the presence of saturated hydrocarbons (such as isopentane and/or hexane) in a catalyst system in combination with reduced amounts of toluene can provide catalyst systems with acceptable levels of flowability to be transported and/or injected into the polymerization reactor.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

I claim:

1. A method for preparing a catalyst system comprising:
contacting at least one aromatic hydrocarbon, at least one activator, at least one catalyst having a Group 3 through Group 12 metal atom or lanthanide metal atom, and at least one inorganic catalyst support to form a first mixture;
reducing the amount of aromatic hydrocarbon in the first mixture to form a second mixture having 1.5 wt % or less of the at least one aromatic hydrocarbon based on the total weight of the second mixture; and
adding at least one saturated hydrocarbon to the second mixture to form a third mixture, wherein the amount of the saturated hydrocarbon in the third mixture is in the range of about 0.1 wt % to about 20 wt %.

2. The method of claim 1, wherein the activator is an alkylalumoxane.

3. The method of claim 1, wherein the saturated hydrocarbon is a $C_4$-$C_{40}$ hydrocarbon or mixture thereof.

4. The method of claim 3, wherein the $C_4$-$C_{40}$ hydrocarbon is selected from the group consisting of isopentane, isohexane, hexane, heptane, and mixtures thereof.

5. The method of claim 1, wherein reducing aromatic hydrocarbon comprises applying heat at about 40° C. or less to the first mixture.

6. The method of claim 1, wherein the second mixture has 0.5 wt % or less of the aromatic hydrocarbon based on the total weight of the second mixture.

7. The method of claim 1, wherein after reducing, the catalyst system comprises about 0 wt % of the aromatic hydrocarbon based on the total weight of the second mixture.

8. The method of claim 1, wherein the catalyst having a Group 3 through Group 12 metal atom or lanthanide metal atom is a metallocene catalyst comprising a Group 4 metal.

9. The method of claim 1, wherein the inorganic catalyst support is selected from the group consisting of $Al_2O_3$, $ZrO_2$, $SiO_2$, $SiO_2/Al_2O_3$, alumina-silica, silica clay, silicon oxide/clay, $SiO_2/TiO_2$, and combinations thereof.

* * * * *